United States Patent
Lee et al.

(10) Patent No.: US 8,376,017 B2
(45) Date of Patent: Feb. 19, 2013

(54) FLEXIBLE SUBSTRATE BONDING AND DEBONDING APPARATUS

(75) Inventors: Jae-Seob Lee, Suwon (KR); Jin-Ho Kwack, Suwon (KR); Tae-Kyung Ahn, Suwon (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 936 days.

(21) Appl. No.: 12/138,313

(22) Filed: Jun. 12, 2008

(65) Prior Publication Data

US 2008/0308231 A1 Dec. 18, 2008

(30) Foreign Application Priority Data

Jun. 14, 2007 (KR) .................... 10-2007-0058528

(51) Int. Cl.
*B32B 38/10* (2006.01)

(52) U.S. Cl. ......... 156/752; 156/711; 156/717; 156/762

(58) Field of Classification Search .................. 156/711, 156/717, 752, 762
See application file for complete search history.

(56) References Cited

U.S. PATENT DOCUMENTS

| | | | | |
|---|---|---|---|---|
| 4,608,109 A | * | 8/1986 | Pook | 156/247 |
| 5,154,793 A | * | 10/1992 | Wojnarowski et al. | 156/711 |
| 5,201,453 A | | 4/1993 | Amador et al. | |
| 5,273,615 A | * | 12/1993 | Asetta et al. | 156/750 |
| 5,407,856 A | | 4/1995 | Quenzer et al. | |
| 5,418,002 A | | 5/1995 | Paik et al. | |
| 5,421,953 A | | 6/1995 | Nagakubo et al. | |
| 5,439,406 A | * | 8/1995 | Fuwa et al. | 445/2 |
| 5,846,375 A | * | 12/1998 | Gilchrist et al. | 156/345.52 |
| 5,915,193 A | | 6/1999 | Tong et al. | |
| 6,583,638 B2 | * | 6/2003 | Costello et al. | 324/750.09 |
| 6,627,037 B1 | * | 9/2003 | Kurokawa et al. | 156/712 |
| 6,765,249 B2 | | 7/2004 | Voutsas et al. | |
| 6,787,885 B2 | | 9/2004 | Esser et al. | |
| 6,911,666 B2 | | 6/2005 | Voutsas | |
| 7,087,134 B2 | | 8/2006 | Chen et al. | |
| 7,150,804 B2 | * | 12/2006 | Tajima | 156/718 |
| 7,847,217 B2 | * | 12/2010 | Chen et al. | 219/388 |
| 2004/0154733 A1 | * | 8/2004 | Morf | 156/241 |
| 2005/0150597 A1 | * | 7/2005 | Henley et al. | 156/344 |
| 2007/0119893 A1 | * | 5/2007 | Rayssac et al. | 225/2 |

(Continued)

FOREIGN PATENT DOCUMENTS

| | | |
|---|---|---|
| DE | 4115046 A | 11/1992 |
| DE | 4404931 A1 | 8/1994 |

(Continued)

*Primary Examiner* — Mark A Osele
(74) *Attorney, Agent, or Firm* — Knobbe, Martens, Olson & Bear LLP

(57) ABSTRACT

A flexible substrate bonding and debonding apparatus is disclosed. In one embodiment, the apparatus includes i) a chamber, ii) a lower chuck disposed in a lower portion of the chamber and having a lower heating unit and a cooling conduit built therein, iii) an upper chuck disposed above the lower chuck and having an upper heating unit built therein, iv) a pressurizing unit disposed above the upper chuck and v) a separating unit corresponding to either side of bonding surfaces of a support substrate and a flexible substrate which are disposed between the lower chuck and the upper chuck. The flexible substrate bonding and debonding apparatus can pressurize the flexible substrate and the support substrate simultaneously using a heat-treatment process. Therefore, the flexible substrate can be more reliably bonded and debonded even at low temperature.

19 Claims, 11 Drawing Sheets

U.S. PATENT DOCUMENTS

| | | | |
|---|---|---|---|
| 2007/0122926 A1 * | 5/2007 | Martinez et al. | 438/34 |
| 2007/0148915 A1 * | 6/2007 | Rayssac et al. | 438/458 |

FOREIGN PATENT DOCUMENTS

| | | |
|---|---|---|
| EP | 0585256 B1 | 9/1992 |
| JP | 06-302486 | 10/1994 |
| JP | 08-028317 | 1/1996 |
| JP | 08-283117 | 10/1996 |
| JP | 2000-353797 | 12/2000 |
| JP | 2004-096047 | 3/2004 |
| JP | 2004-144970 | 5/2004 |
| KR | 10-1996-0004072 | 3/1996 |
| KR | 10-1998-0054434 | 9/1998 |
| KR | 10-2001-0036196 | 5/2001 |
| KR | 10-2001-0095621 | 11/2001 |
| KR | 10-2002-0038324 | 5/2002 |
| KR | 10-2002-0074963 | 10/2002 |
| KR | 10-2005-0113478 | 12/2005 |
| KR | 10-0571848 | 4/2006 |
| KR | 10-2006-0081907 | 7/2006 |
| KR | 10-2007-0069237 A | 7/2007 |
| SG | 52471 A | 11/1997 |

* cited by examiner

FLEXIBLE SUBSTRATE BONDING AND DEBONDING APPARATUS

CROSS-REFERENCE TO RELATED APPLICATION

This application claims the benefit of Korean Patent Application No. 2007-58528, filed Jun. 14, 2007, the disclosure of which is hereby incorporated herein by reference in its entirety.

BACKGROUND OF THE INVENTION

1. Field of the Invention

The present invention relates to a flexible substrate bonding and debonding apparatus, and more specifically, to a flexible substrate bonding and debonding apparatus including a heating unit, a pressurizing unit, and a separating unit.

2. Description of the Related Art

In general, flat panel displays (FPDs) are divided into a liquid crystal display (LCD), a field emission display (FED), an organic light emitting diode display (OLED), and the like.

The FPD is formed on a transparent glass substrate which can transmit light. However, the glass substrate is so rigid that a flexible display cannot be implemented.

Therefore, i) a thin glass substrate which is more flexible than the conventional glass substrate, ii) a plastic substrate which has an excellent flexibility property and is not easily damaged by an external impact, and iii) a metal substrate which has an excellent heat-resistance property and is flexible may be used to implement a flexible display.

SUMMARY OF CERTAIN INVENTIVE ASPECTS

One aspect of the present invention provides a flexible substrate bonding and debonding apparatus which includes a heating unit and a pressurizing unit for bonding a support substrate to a flexible substrate and a separating unit for debonding the support substrate from the flexible substrate.

Another aspect of the present invention provides a flexible substrate bonding and debonding apparatus which includes i) a chamber, ii) a lower chuck disposed in a lower portion of the chamber and having a lower heating unit and a cooling conduit built therein, iii) an upper chuck disposed above the lower chuck and having an upper heating unit built therein, iv) a pressurizing unit disposed above the upper chuck and v) a separating unit corresponding to either side of bonding surfaces of a support substrate and a flexible substrate which are disposed between the lower chuck and the upper chuck.

Another aspect of the present invention provides a flexible substrate bonding apparatus which includes i) a chamber, ii) a lower chuck disposed in a lower portion of the chamber and having a lower heating unit and a cooling conduit built therein, iii) an upper chuck disposed above the lower chuck and having an upper heating unit built therein and iv) a pressurizing unit disposed above the upper chuck.

Another aspect of the invention provides a flexible substrate debonding apparatus which includes i) a chamber, ii) a lower chuck disposed in a lower portion of the chamber and iii) a separating unit corresponding to either side of bonding surfaces of a support substrate and a flexible substrate which are disposed on the lower chuck. Another aspect of the invention provides a flexible substrate bonding and debonding apparatus, comprising: i) a chamber comprising fist and second surfaces opposing each other, ii) a first chuck located in a first portion of the chamber, wherein the first chuck comprises a first heater, and wherein the first portion is closer to the first surface than the second surface of the chamber, iii) a second chuck located in a second portion of the chamber, wherein the second chuck comprises a second heater, wherein the second portion is closer to the second surface than the first surface of the chamber, wherein the first and second chucks comprise opposing surfaces, wherein the first and second chucks are configured to contact a support substrate and a flexible substrate via the opposing surfaces, and wherein the flexible substrate is thinner than the supporting substrate, iv) a pressurizer connected to the second chuck and configured to apply pressure to at least one of the support substrate and flexible substrate via the second chuck so as to bond the two substrates and v) a separator configured to separate the two substrates.

At least one of the first and second heaters may comprise coil-shaped hot wires. At least one of the first and second heaters may comprise halogen lamps. The second chuck may comprise a cooling conduit configured to receive refrigerant. The cooling conduit may be integrated into the first chuck. In the apparatus, the refrigerant is cooling water. The first and second heaters may be integrated into the first and second chucks, respectively. The first and second heaters may be configured to heat the supporting substrate and flexible substrate, respectively. The first chuck may be configured to contact the supporting substrate and the second chuck is configured to contact the flexible substrate. The separator may be located between the first and second chucks. The pressurizer may be connected to the second chuck via a cylinder. The separator may be formed in a metal-blade shape. The separator may be formed of a metallic wire.

Another aspect of the invention provides a flexible substrate bonding apparatus comprising: i) a chamber comprising first and second surfaces opposing each other, ii) a first chuck located in a first portion of the chamber, wherein the first chuck comprises a first heater and a cooling conduit, and wherein the first portion is closer to the first surface than the second surface of the chamber, iii) a second chuck located in a second portion of the chamber, wherein the second chuck comprises a second heater, wherein the second portion is closer to the second surface than the first surface of the chamber, wherein the first and second chucks comprise opposing surfaces, wherein the first and second chucks are configured to contact a support substrate and a flexible substrate via the opposing surfaces, and wherein the flexible substrate is thinner than the supporting substrate and iv) a pressurizer connected to the second chuck and configured to apply pressure to at least one of the support substrate and flexible substrate via the second chuck so as to bond the two substrates.

Each of the first and second heaters may comprise at least one of coil-shaped hot wires and halogen lamps. The pressurizer may be configured to apply pressure to the flexible substrate via the second chuck. The first and second heaters may be configured to heat the supporting substrate and flexible substrate, respectively. The cooling conduit may be configured to introduce cooling water.

Still another aspect of the invention provides a flexible substrate debonding apparatus comprising: i) a chamber comprising top and bottom surfaces opposing each other, ii) a chuck located in a portion of the chamber, wherein the first chuck comprises a heater, wherein the portion is closer to the bottom surface than the top surface of the chamber, wherein the chuck is configured to receive a support substrate and a flexible substrate bonded to each other, and wherein the flexible substrate is thinner than the supporting substrate and iii) a separator configured to separate the two substrates. The separating unit may be formed of a metal-blade or a metallic wire.

BRIEF DESCRIPTION OF THE DRAWINGS

Embodiments of the present invention will be described with reference to the attached drawings.

DETAILED DESCRIPTION OF PREFERRED EMBODIMENTS

Figure 1:
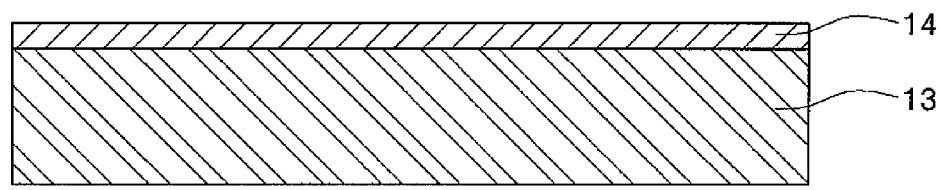
FIG. 1 is a cross-sectional view of a flexible substrate bonded on a support substrate according to one embodiment of the invention.

Generally, flexible substrates have an extremely small thickness, there are difficulties in dealing with the flexible substrates when a manufacturing process of FPD including a cleaning process, a thin-film deposition process, a patterning process and the like is performed on the flexible substrates.

Accordingly, a support substrate, which is thicker than the flexible substrate, is bonded to one surface of the flexible substrate such that the manufacturing process can be easily performed.

After that, an FPD such as an OLED is formed on the flexible substrate bonded to the support substrate. Then, the support substrate is debonded and removed, in order to secure flexibility which is an inherent property of the flexible substrate.

In the process of bonding and debonding the flexible substrate, when the bonding is performed using only a heat-treatment process, high temperature of more than about 1000° C. may be required, and there may be difficulties in performing the bonding and debonding process. Embodiments of the present invention will now be described more fully hereinafter with reference to the accompanying drawings, in which exemplary embodiments of the invention are shown. This invention may, however, be embodied in different forms and should not be construed as limited to the embodiments set forth herein. In the drawings, the thickness of layers and regions are exaggerated for clarity. Like numbers refer to like elements throughout the specification.

FIG. 1 is a cross-sectional view of a flexible substrate bonded on a support substrate according to one embodiment of the invention.

Referring to FIG. 1, a support substrate 13 and a flexible substrate 14 boned on the support substrate 13 are manufactured by, for example, the following process.

First, generally, a polishing process is physically and chemically performed on opposite bonding surfaces of the support substrate 13 and the flexible substrate 14 such that the opposite bonding surfaces become smooth.

Subsequently, a cleaning and drying process is typically performed through a plurality of stages, in order to remove foreign materials generated in the polishing process.

Next, a plasma process is generally performed on the opposite bonding surfaces of the support substrate 13 and the flexible substrate 14

In the plasma process, certain layers such as radical films with high reactivity are formed on the surfaces of the support substrate 13 and the flexible substrate 14. Then, the support substrate 13 and the flexible substrate 14 may be provisionally bonded to each other using a covalent bond between the radical films.

Next, a heat treatment process and a pressure process are generally performed on the support substrate 13 and the flexible substrate 14 which are provisionally bonded to each other. According to one embodiment, it is possible to obtain a flexible substrate 14 having a more excellent bonding property.

According to one embodiment, as the heat treatment process and the pressure process are performed, it is possible to implement a flexible substrate 14 having an excellent bonding property at a low temperature of less than about 300° C.

The above-described bonding and debonding process may be realized by a flexible substrate bonding and debonding apparatus according to one embodiment of the invention.

Figure 2A:
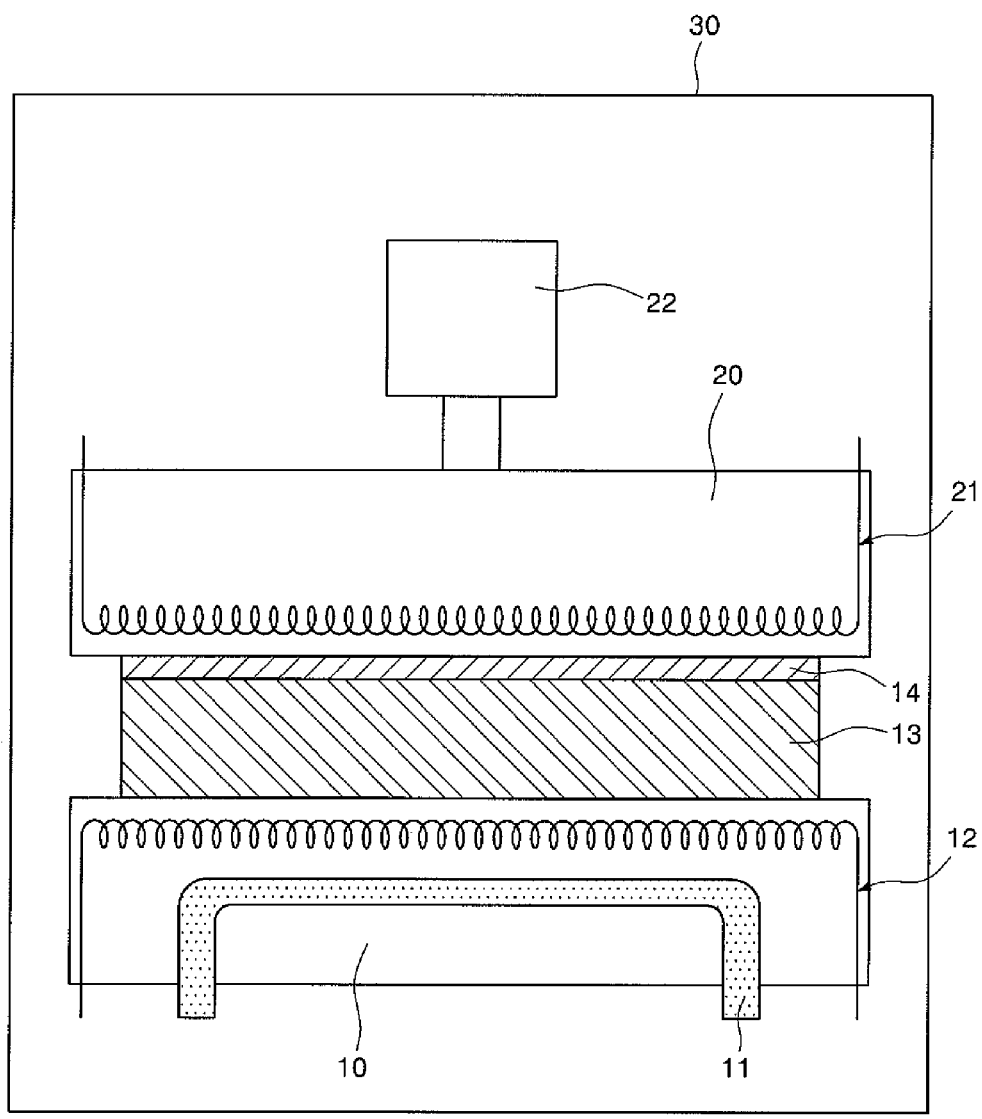
FIGS. 2A and 2B are cross-sectional views of a flexible substrate bonding apparatus according to one embodiment of the invention.
Figure 2B:
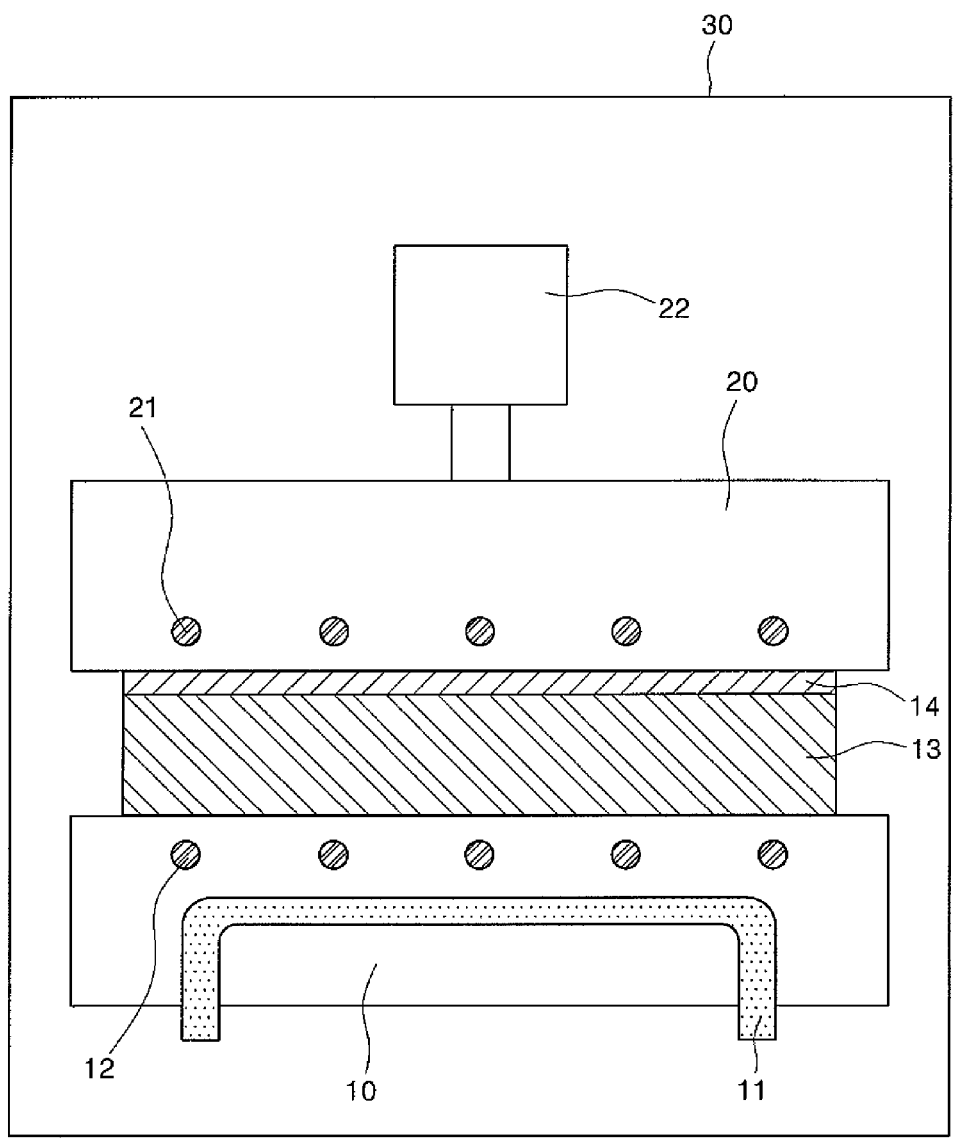

FIGS. 2A and 2B are cross-sectional views of a flexible substrate bonding apparatus according to one embodiment of the invention.

Referring to FIGS. 2A and 2B, the flexible substrate bonding apparatus includes a chamber 30, a lower chuck 10 which is disposed in a lower portion of the chamber 30 and supports a support substrate 13 and a flexible substrate 14, an upper chuck 20 disposed above the lower chuck 10, and a pressurizing unit 22 which is disposed above the upper chuck 20 and pressurizes the upper chuck 20.

More specifically, since the lower chuck 10 is disposed in a lower portion of the chamber 30 and may have a lower heating unit 12 built therein, the support substrate 13 and the flexible substrate 14, which are disposed on the lower chuck 10 and are provisionally bonded through the radical films, may be heat-treated by the lower heating unit 12.

According to one embodiment, when heat is applied in a state where the support substrate 13 and the flexible substrate 14 may be provisionally bonded through a covalent bond between the radical films, it is possible to obtain an excellent bonding property in which bonding density increases.

Inside the lower chuck 10, a cooling conduit 11 may be disposed under the lower heating unit, and connected to a separate cooling apparatus (not shown). In one embodiment, certain cooling liquid such as cooling water is introduced into the cooling conduit 11 so as to cool down the lower chuck 10. Then, the temperature of the flexible substrate 13 and the support substrate 13, which are disposed on the lower chuck 10 and are bonded to each other, decreases. In another embodiment, refrigerant other than water may be used.

The upper chuck 20 is disposed above the lower chuck 10 and may have an upper heating unit 21 built therein. Therefore, the support substrate 13 and the flexible substrate 14, which are disposed between the lower chuck 10 and the upper chuck 20 and provisionally bonded through the radical films, may be heat-treated by the upper heating unit 21.

Therefore, the support substrate 13 and the flexible substrate 14 may be substantially simultaneously heat-treated by the upper heating unit 21 and the lower heating unit 12, such that the support substrate 13 and the flexible substrate 14 can be uniformly heat-treated. In one embodiment, the flexible substrate 14 is prevented from being bent due to a temperature difference, thereby obtaining an excellent bonding property.

The pressurizing unit 22 is disposed above the upper chuck 20. The pressurizing unit 22 is connected to the upper chuck 20 through, for example, a cylinder so as to descend the upper chuck 20.

In one embodiment, the upper chuck 20 pressurizes the support substrate 13 and the flexible substrate 14 by the pressurizing unit 22, substantially at the same time when the support substrate 13 and the flexible substrate 14 are heat-treated by the upper and lower heating units 21 and 12, thereby obtaining a more excellent bonding property.

The upper and lower heating units 21 and 12 may be coil-shaped hot wires as shown in FIG. 2A. Further, the upper and lower heating units 21 and 12 may be certain lighting devices such as halogen lamps, as shown in FIG. 2B. In this case, portions of the lower and upper chucks 10 and 20 are formed of a material, such as quartz, which can transmit light. Therefore, light of the halogen lamps is transmitted onto the support substrate 13 and the flexible substrate 14, which makes it possible to obtain an excellent bonding property.

Hereinafter, the operation of the flexible substrate bonding apparatus shown in FIGS. 2A and 2B will be described.

First, the support substrate 13 and the flexible substrate 14, which are provisionally bonded, are disposed on the lower chuck 10. Subsequently, a pressure process is performed in which the pressurizing unit 22 applies a pressure of about 100 N so as to descend the upper chuck 20. Therefore, the support substrate 13 and the flexible substrate 14, which are disposed between the upper chuck 20 and the lower chuck 10 and are provisionally bonded, may be bonded to each other by the pressure of 100 N.

Next, a heat-treatment process is performed for about 30 minutes. In the heat-treatment process, heat is generated by the upper heating unit 21 and the lower heating unit 12 formed of coil-shaped hot wires, or a temperature of less than about 300° C. is maintained by, for example, the halogen lamps. Therefore, the support substrate 13 and the flexible substrate 14, which are provisionally bonded to each other, can be more firmly bonded through the heat-treatment process.

Simultaneously with the heat-treatment process, a pressure process is performed for about two hours using a pressure of about 8000 N. In one embodiment, it is possible to obtain a reversible-reaction bonding surface at low temperature, which cannot be obtained at a temperature of more than about 1000° C.

Subsequently, refrigerant such as cooling water is supplied to the cooling conduit 11 from the cooling device (not shown) such that the temperature decreases to less than about 5° C.

Then, the pressure of the pressurizing unit 22 is also reduced to substantially 0 N to thereby complete the bonding process.

Next, the support substrate 13 and the flexible substrate 14, which have been completely bonded, are taken out of the flexible substrate bonding apparatus.

Figure 3A:
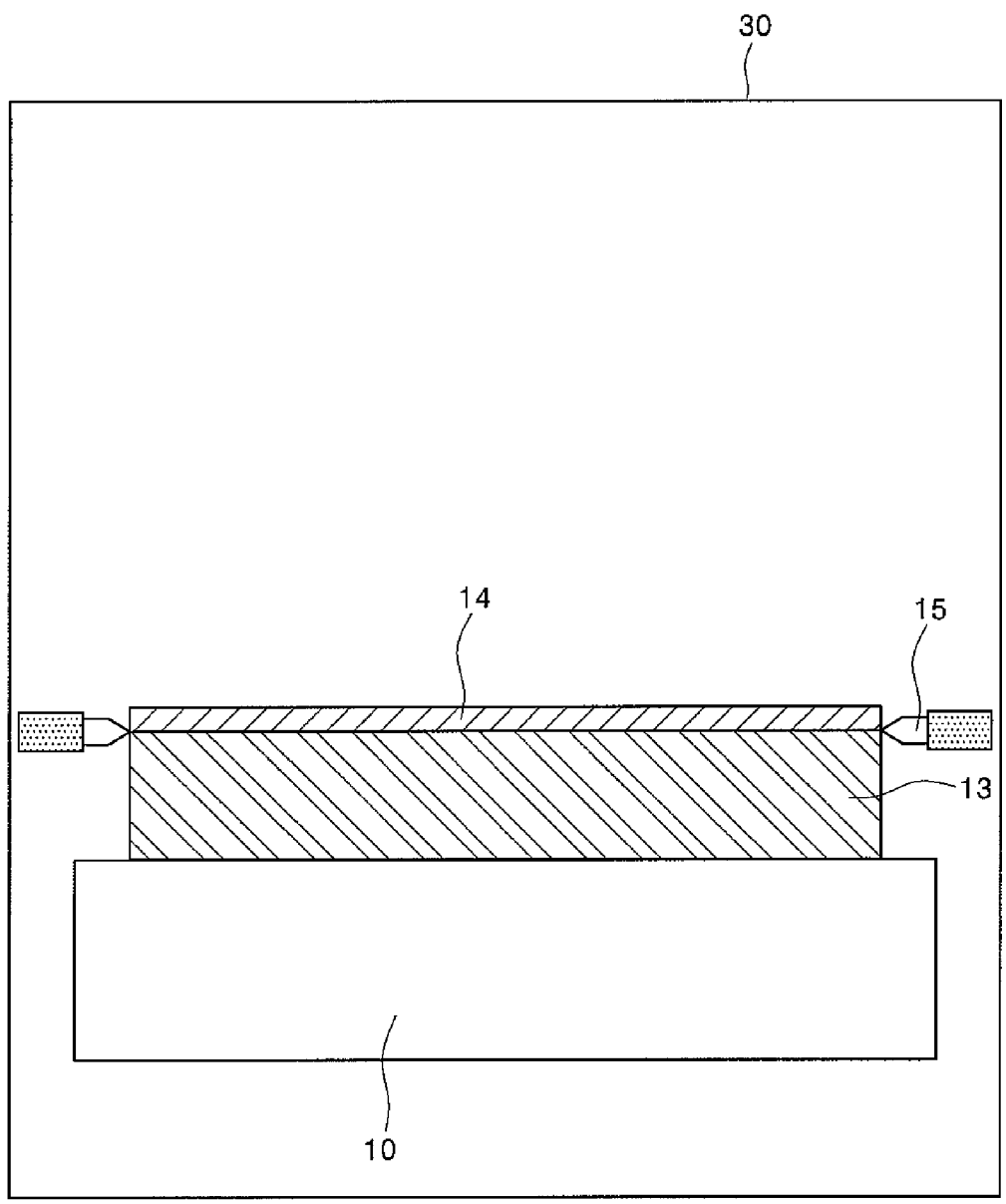
FIG. 3A is a cross-sectional view of a flexible substrate debonding apparatus according to another embodiment of the invention.
Figure 3B:
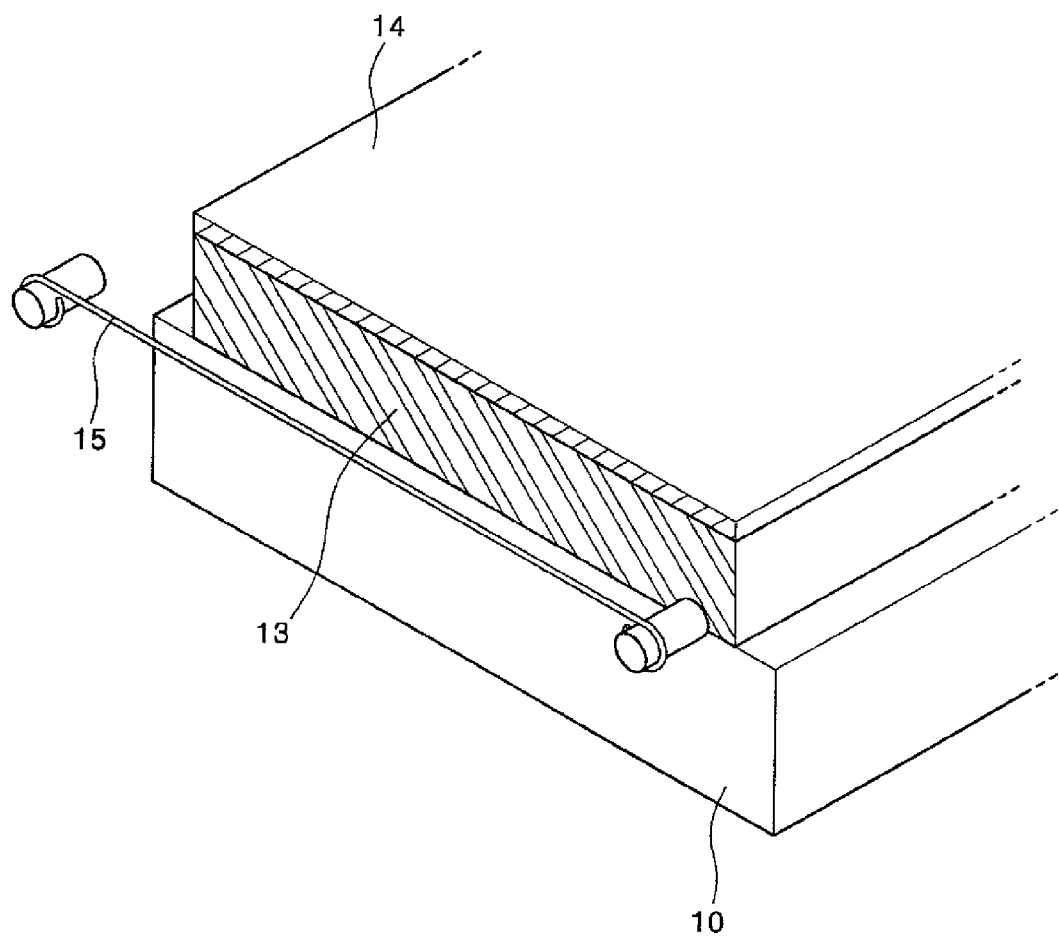
FIG. 3B is a perspective view of a flexible substrate debonding apparatus according to another embodiment of the invention.

FIGS. 3A and 3B are cross-sectional views of a flexible substrate debonding apparatus according to another embodiment of the invention.

Referring to FIGS. 3A and 3B, the flexible substrate debonding apparatus includes a chamber 30, a lower chuck 10 disposed in a lower portion of the chamber 30, and a separating unit 15 which is disposed above the lower chuck 10 and faces either side of the bonding surfaces of the flexible substrate 14 and the support substrate 13. The flexible substrate 14 may include an OLED (not shown) formed thereon.

More specifically, the lower chuck 10 is disposed in the lower portion of the chamber 30 and fixes the flexible substrate 14 and the support substrate 13 which are bonded to each other. At this time, the separating unit 14 formed in, for example, a metal-blade shape is inserted between the bonding surfaces of the flexible substrate 14 and the support substrate 13 using a constant pressure, as shown in FIG. 3A. Therefore, the bonding surfaces of the flexible substrate 14 and the support substrate 13 may be separated.

Further, as shown in FIG. 3B, the separate unit 15 may be formed of, for example, a metallic wire. The metallic wire may separate the bonding surfaces of the flexible substrate 14 and the support substrate 13 through a tensile force applied by fixing units provided in both sides.

Figure 4A:
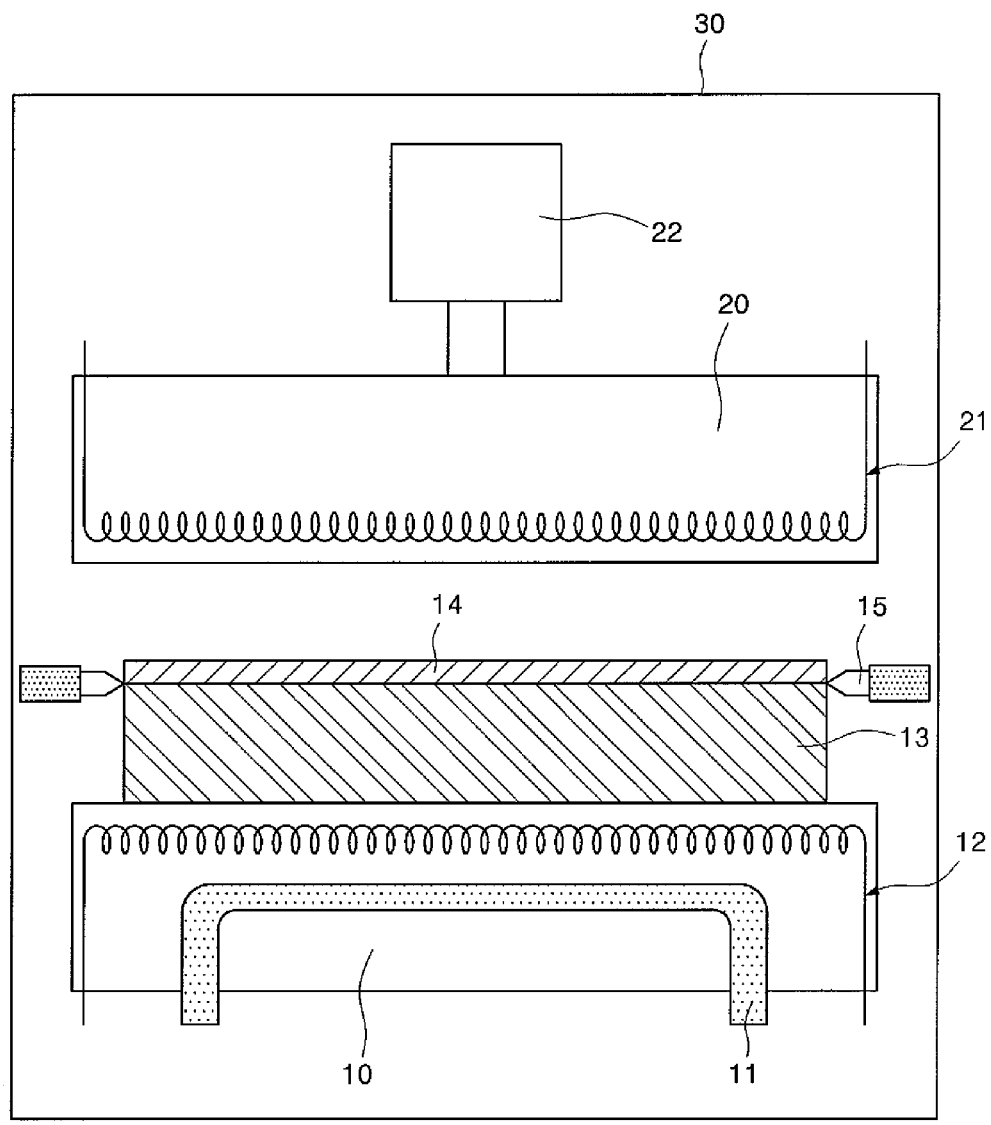
FIG. 4A is a cross-sectional view of a flexible substrate bonding and debonding apparatus according to another embodiment of the invention.
Figure 4B:
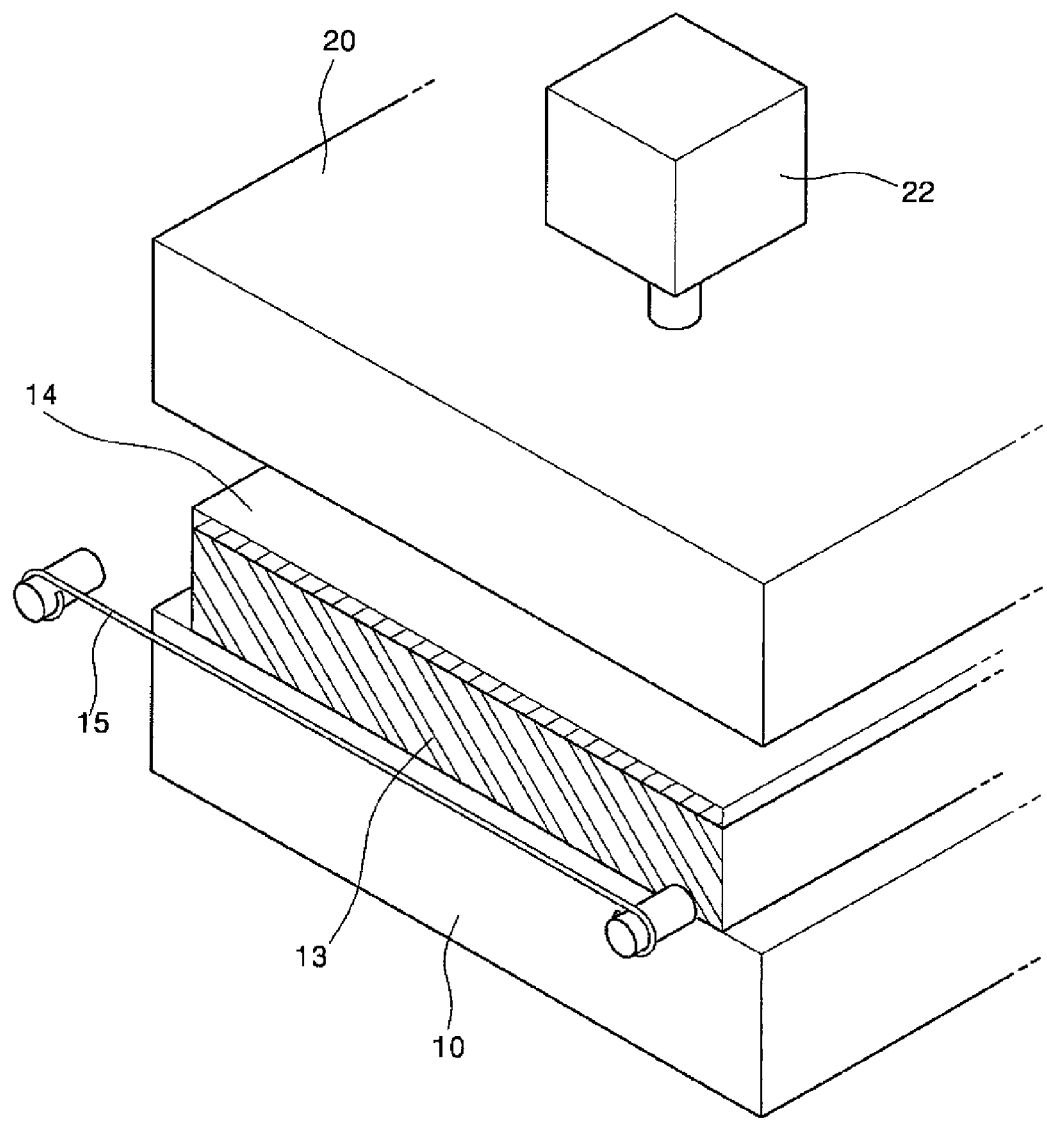
FIG. 4B is a perspective view of a flexible substrate debonding apparatus according to another embodiment of the invention.

FIGS. 4A and 4B are cross-sectional views of a flexible substrate bonding and debonding apparatus according to another embodiment of the invention.

Referring to FIGS. 4A and 4B, the flexible substrate bonding and debonding apparatus includes a chamber 30, a lower chuck 10 which is disposed in a lower portion of the chamber 30 and supports the support substrate 13 and the flexible substrate 14, an upper chuck 20 disposed above the lower chuck 10, a pressurizing unit 22 which is disposed above the upper chuck 20 and pressurizes the upper chuck 20, and a separating unit 15 disposed above the lower chuck 10.

More specifically, since the lower chuck 10 is disposed in a lower portion of the chamber 30 and may have a lower heating unit 12 built therein, the support substrate 13 and the flexible substrate 14, which are disposed on the lower chuck 10 and are provisionally bonded through radical films, may be heat-treated by the lower heating unit 12.

In one embodiment, when heat is applied in a state where the support substrate 13 and the flexible substrate 14 may be provisionally bonded through a covalent bond between the radical films, it is possible to obtain an excellent bonding property in which bonding density increases.

Inside the lower chuck 10, a cooling conduit 11 may be disposed under the lower heating unit 12, and connected to a separate cooling apparatus (not shown). In one embodiment, certain refrigerant such as cooling water is introduced into the cooling conduit 11 so as to cool down the lower chuck 10. Then, the temperature of the flexible substrate 13 and the support substrate 13, which are disposed on the lower chuck 10 and are bonded to each other, decreases.

The upper chuck 20 is disposed above the lower chuck 10 and may have an upper heating unit 21 built therein. Therefore, the support substrate 13 and the flexible substrate 14, which are disposed between the lower chuck 10 and the upper chuck 20 and provisionally bonded through the radical films, may be heat-treated by the upper heating unit 21.

Therefore, the support substrate 13 and the flexible substrate 14 may be substantially simultaneously heat-treated by the upper heating unit 21 and the lower heating unit 12, such that the support substrate 13 and the flexible substrate 14 can be uniformly heat-treated. In this embodiment, the flexible substrate 14 is prevented from being bent due to a temperature difference, thereby obtaining an excellent bonding property.

The pressurizing unit 22 is disposed above the upper chuck 20. The pressurizing unit 22 is connected to the upper chuck 20 through, for example, a cylinder so as to descend the upper chuck 20.

Therefore, the upper chuck 20 may pressurize the support substrate 13 and the flexible substrate 14 using the pressurizing unit 22, substantially at the same time when the support substrate 13 and the flexible substrate 14 are heat-treated by the upper and lower heating units 21 and 12. In one embodiment, it is possible to obtain a more excellent bonding property.

The upper and lower heating units 21 and 12 may be coil-shaped hot wires as shown in FIG. 2A. Further, the upper and lower heating units 21 and 12 may be certain lighting devices such as halogen lamps, as shown in FIG. 2B. In this case, portions of the lower and upper chucks 10 and 20 are formed of a material, such as quartz, which can transmit light. Therefore, light of the halogen lamps is transmitted onto the support substrate 13 and the flexible substrate 14, which makes it possible to obtain an excellent bonding property.

The separating unit 15 is disposed to correspond to either side of the bonding surfaces of the flexible substrate 14 and the support substrate 13.

The separating unit 15 formed in, for example, a metal-blade shape is inserted between the bonding surfaces by a constant pressure so as to separate the bonding surfaces of the flexible substrate 14 and the support substrate 13, as shown in FIG. 4A. Further, the separating unit 15 may be formed of a metallic wire, as shown in FIG. 4B. The metallic wire may separate the bonding surfaces of the flexible substrate 14 and the support substrate 13 through a tensile force applied by fixing units provided in both sides.

Hereinafter, the operation of the flexible bonding and debonding apparatus according to one embodiment of the invention will be described in detail.

First, the support substrate 13 and the flexible substrate 14, which are provisionally bonded, are disposed on the lower chuck 10. Subsequently, a pressure process is performed in which the pressurizing unit 22 applies a pressure of about 100 N so as to descend the upper chuck 20. Therefore, the support substrate 13 and the flexible substrate 14, which are disposed between the upper chuck 20 and the lower chuck 10 and are provisionally bonded, may be bonded to each other by the pressure of about 100 N.

Next, a heat-treatment process is performed for about 30 minutes. In the heat-treatment process, heat is generated by the upper heating unit 21 and the lower heating unit 12 including, for example, coil-shaped hot wires, or a temperature of less than about 300° C. is maintained by, for example, the halogen lamps. Therefore, the support substrate 13 and the flexible substrate 14, which are provisionally bonded to each other, may be more firmly bonded through the heat-treatment process.

Substantially simultaneously with the heat-treatment process, the pressure process is performed for about two hours using a pressure of about 8000 N. In one embodiment, it is possible to obtain a reversible-reaction bonding surface at low temperature, which cannot be obtained at a temperature of more than about 1000° C.

Subsequently, certain refrigerant such as cooling water is supplied to the cooling conduit 11 from the cooling device (not shown) such that the temperature decreases to less than about 5° C.

Then, the pressure of the pressurizing unit 22 is also reduced to about 0 N to thereby complete the bonding process.

Next, the support substrate 13 and the flexible substrate 14, which have been completely bonded, are taken out of the bonding apparatus.

After that, the support substrate 13 and the flexible substrate 14, which have been taken out, are input to a process of manufacturing an FPD such as an OLED which includes a thin-film transistor.

FIGS. 5A to 5F are cross-sectional views showing a process of manufacturing an OLED including a thin-film transistor according to one embodiment of the invention.

Figure 5A:
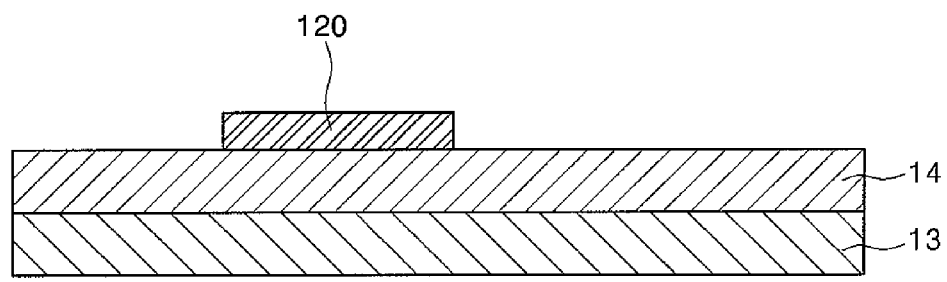
FIGS. 5A to 5F are cross-sectional views showing a process of manufacturing an OLED including a thin-film transistor according to one embodiment of the invention.

Referring to FIG. 5A, a buffer layer (not shown) including $SiO_2$ may be formed on the flexible substrate 14 which is bonded on the support substrate 13 by the heat-treatment process and the pressure process. The buffer layer serves to protect the flexible substrate 14 and to insulate the flexible substrate 14 from an element formed thereon.

In this case, a metal intermediate layer (not shown) including at least one of Fe, Ni, Sn, Zn, Cr, Co, Si, Mg, Ti, Zr, Al, Ag, and Cu or an alloy thereof may be further formed between the support substrate 13 and the flexible substrate 14, before the heat-treatment process and the pressure process are performed.

When the metal intermediate layer is not formed, an atomic bond within the bonding surfaces of the support substrate 13 and the flexible substrate 14 is a covalent bond. However, when the metal intermediate layer is formed, the covalent bond changes into a metallic bond in which bonding density is high. In one embodiment, it is possible to obtain a more excellent bonding property.

Subsequently, an amorphous silicon layer is formed on the buffer layer. The amorphous silicon layer may be formed by a physical vapor deposition (PVD) method such as sputtering or a chemical vapor deposition (CVD) method such as plasma enhanced chemical vapor deposition (PECVD) or low pressure chemical vapor deposition (LPCVD).

Further, when or after the amorphous silicon layer is formed, a dehydrogenization process may be performed to reduce hydrogen concentration.

Then, the amorphous silicon layer is crystallized into a polycrystal silicon layer. The method of crystallizing the amorphous silicon layer may include excimer laser annealing (ELA), sequential lateral solidification (SLS), metal induced crystallization (NIC), metal induced later crystallization (MILC), or super grained silicon (SGS).

Next, the polycrystal silicon layer is patterned to form a predetermined pattern of semiconductor layer 120.

Figure 5B:
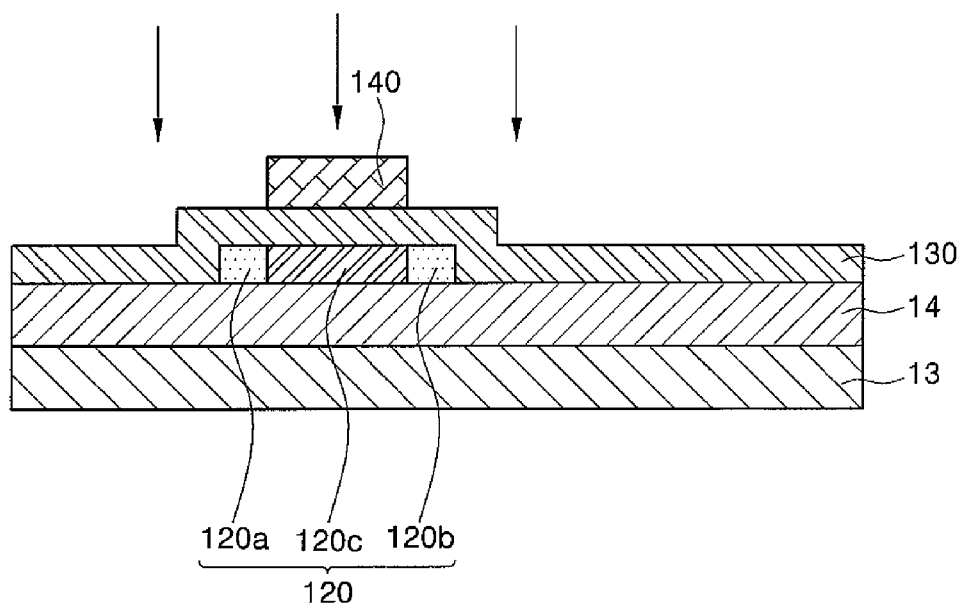

Then, as shown in FIG. 5B, a gate insulating layer 130 is formed on the entire surface of the substrate where the semiconductor layer 120 is formed. The gate insulating layer 130 protects the elements formed thereunder and electrically insulates the elements from elements which are to be formed on the gate insulating layer 130.

Subsequently, on the gate insulating layer 130, a gate metal layer is formed of at least one of Al, an Al alloy, Mo, and a Mo alloy.

Next, the gate metal layer is patterned to form a gate electrode 140 corresponding to a predetermined region of the semiconductor layer 120.

Then, using the gate electrode 140 as a mask, a process of injecting n-type or p-type impurities is performed to form source and drain regions 120a and 120b and a channel region 120c in the semiconductor layer 120. In this case, the reason why the semiconductor layer 120 is divided into the source and drain regions 120a and 120b and the channel region 120c is that the regions into which the impurities are injected into by the above-described process are defined as the source and drain regions 120a and 120b, and the region into which the impurities are not injected because of the gate electrode 140 is defined as the channel region 120c where a channel is formed when a thin-film transistor is driven.

Figure 5C:
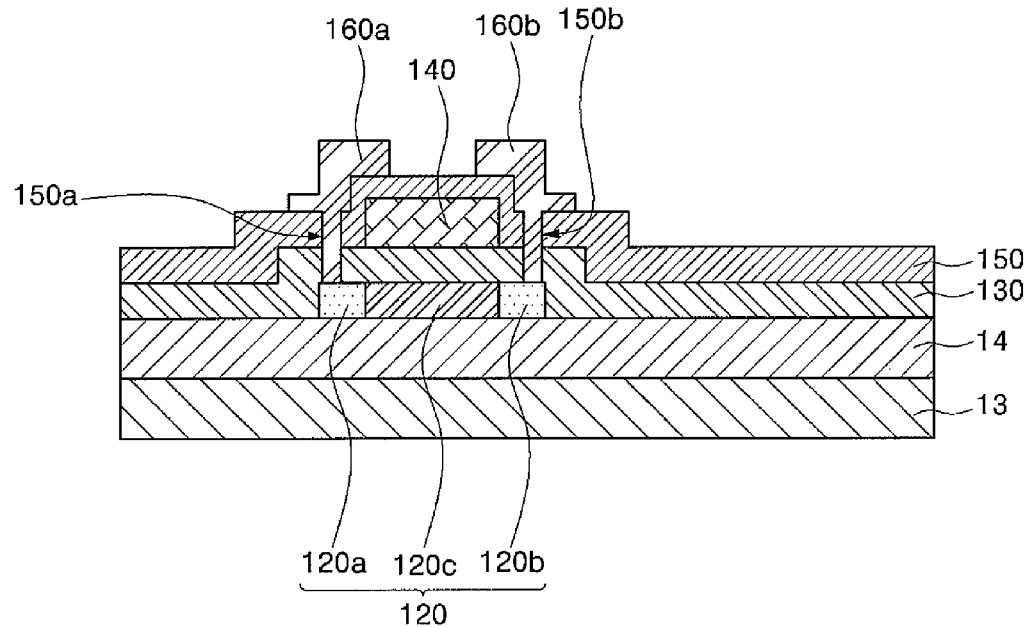

Next, referring to FIG. 5C, an interlayer insulating layer 150 is formed on the entire surface of the substrate. The interlayer insulating layer 150 protects the elements formed thereunder and electrically insulates the elements from elements which are to be formed on the interlayer insulating layer 150.

The gate insulating layer 130 and the interlayer insulating layer 150 may be formed of at least one of $SiO_2$ and $SiN_x$.

Further, the gate insulating layer 130 and the interlayer insulating layer 150 may be formed of a combination of $SiO_2$ and SiNx.

Subsequently, contact holes 150a and 150b are formed to pass through the interlayer insulating layer 150 and the gate insulating layer 130 such that portions of the source and drain regions 120a and 120b of the semiconductor layer 120 are exposed.

Then, predetermined patterns of source and drain electrodes 160a and 160b, which are connected to the source and drain regions 120a and 120b of the semiconductor layer 120 through the contact holes 150a and 150b, are formed on the interlayer insulating layer 150, thereby forming a thin-film transistor.

The source and drain electrodes 160a and 160b may be formed of at least one of Al, an Al alloy, Mo, and a Mo alloy.

Figure 5D:
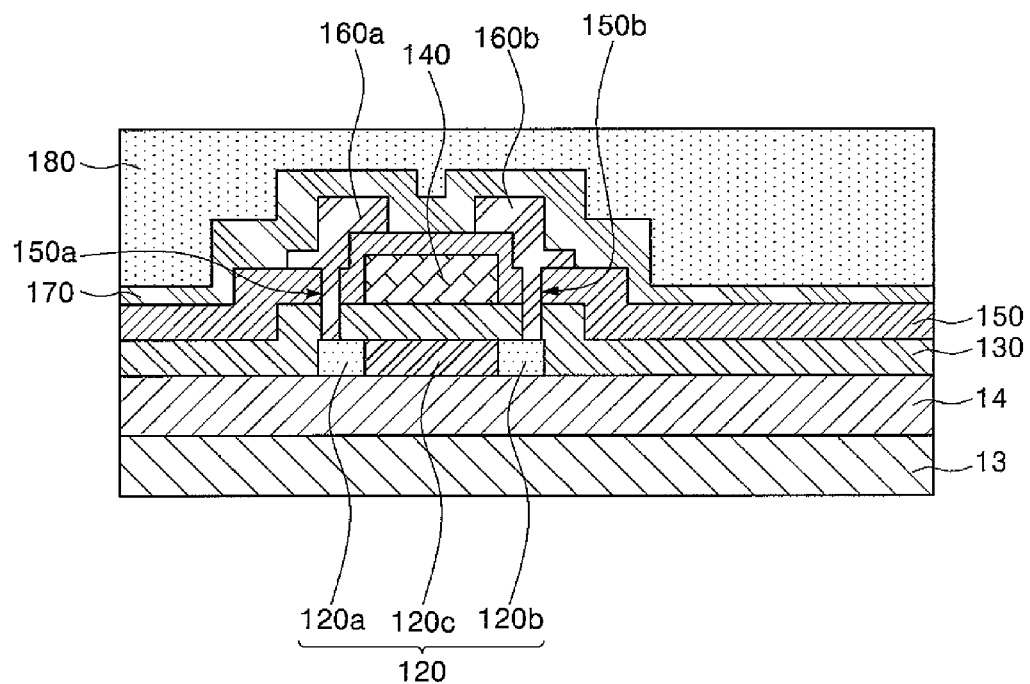

Next, as shown in FIG. 5D, a passivation layer 170 is formed on the entire surface of the substrate. The passivation layer 170 may be formed of at least one of $SiO_2$ and SiNx. Further, the passivation layer 170 may be formed of a combination of $SiO_2$ and SiNx.

Subsequently, a planarization layer 180 is formed on the passivation layer 170. The planarization layer 180 may be formed of an organic layer and may be formed of at least one of acryl, benzocyclobutene (BCB), and polyimide in order to reduce a step height on the substrate.

Figure 5E:
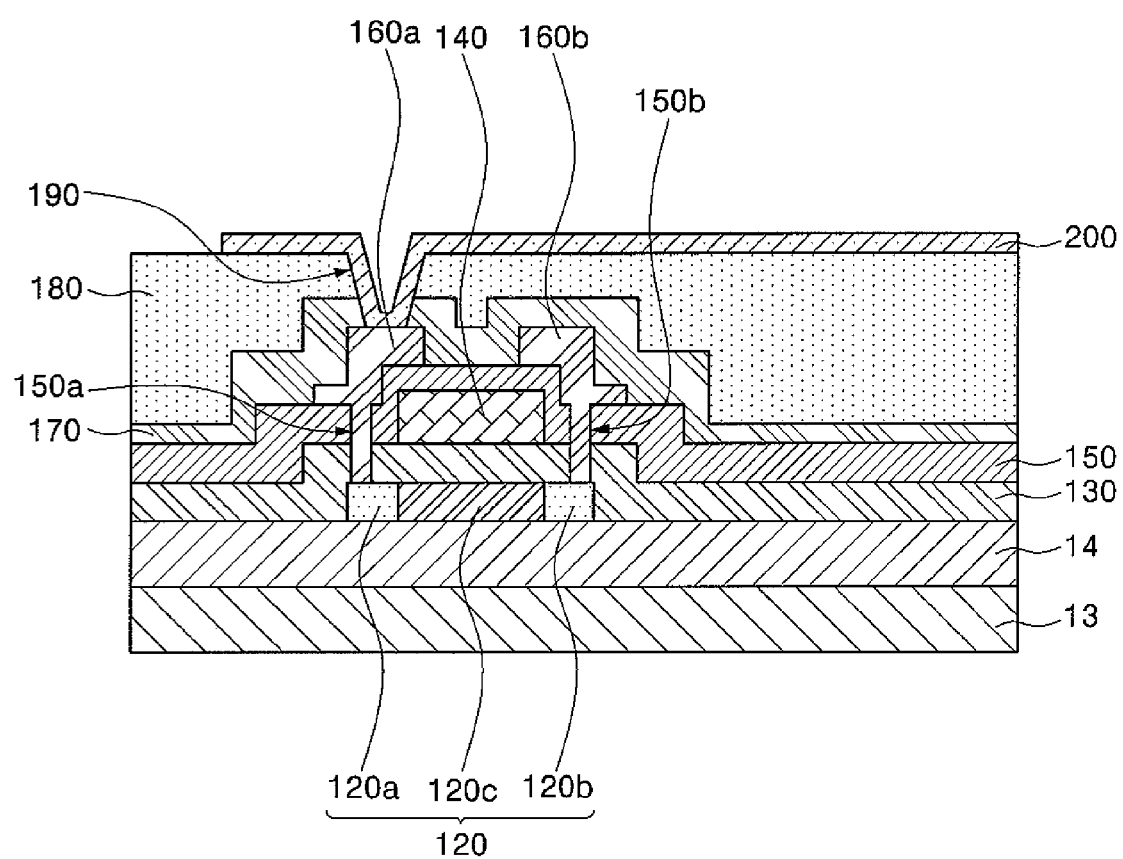

Then, as shown in FIG. 5E, predetermined regions of the passivation layer 170 and the planarization layer 180 are etched to form a via hole 190 which exposes any one of the source and drain electrodes 160a and 160b.

Next, a pixel electrode 200 is formed on the planarization layer 180. The pixel electrode 200 is connected to one of the source and drain electrodes 160a and 160b exposed through the via hole 190. The pixel electrode 200, which is formed of a transparent electrode such as indium tim oxide (ITO) or indium zinc oxide (IZO), may emit light in the bottom direction.

The pixel electrode 200 may include a reflecting layer (not shown) disposed thereunder so as to emit light in the top direction. The reflecting layer is formed of at least one of Pt, Au, Ir, Cr, Mg, Ag, Al, and an alloy thereof.

Figure 5F:
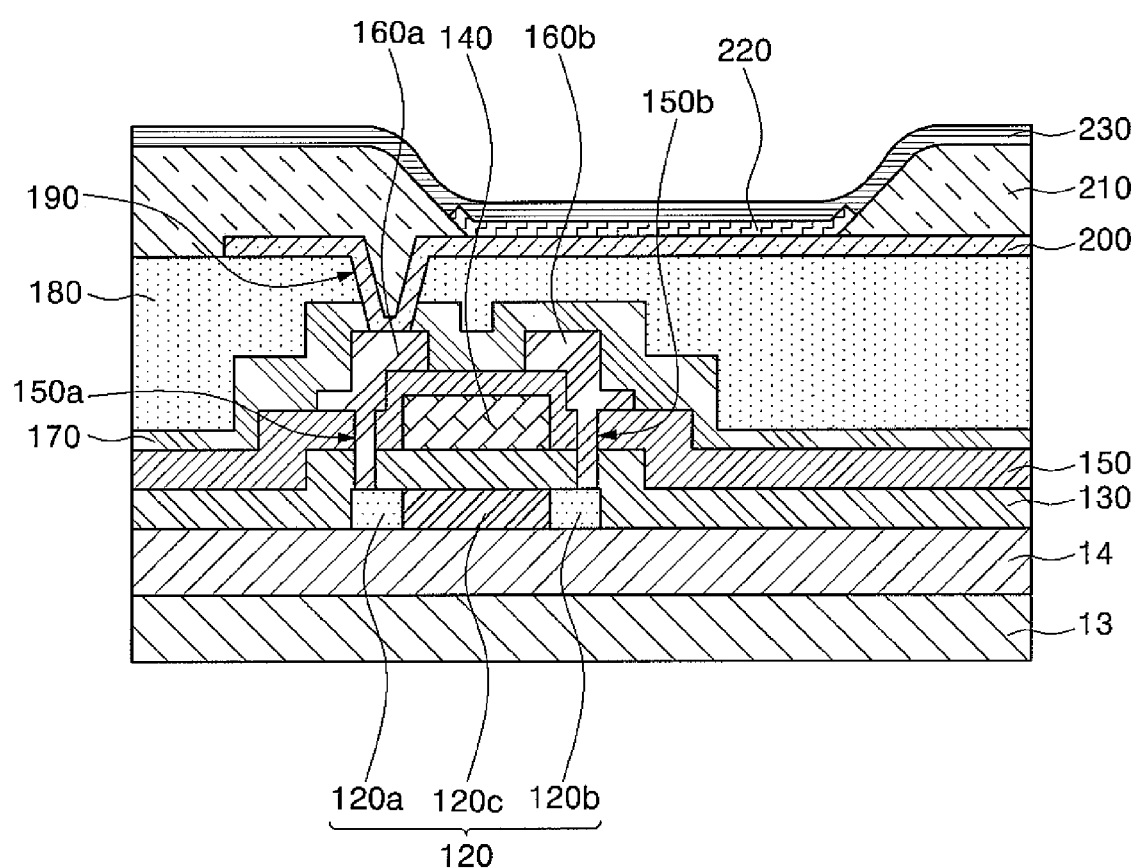

Next, as shown in FIG. 5F, a pixel defining layer 210 provided with an opening, which exposes a predetermined region of the pixel electrode 200, is formed on the entire surface of the substrate. The pixel defining layer 210 may be formed of at least one of benzocyclobutene (BCB), acrylic polymer, and polyimide.

Subsequently, an organic layer 220 including an organic emission layer (not shown) is formed on the pixel electrode 200 exposed through the opening, and a counter electrode 230 is formed on the entire surface of the substrate, thereby implementing an OLED.

After that, the flexible substrate 14 and the support substrate 13, which are bonded in a state where the OLED is formed on the flexible substrate 14, are put into the flexible substrate bonding and debonding apparatus according to the invention.

Subsequently, the bonding surfaces of the flexible substrate 14 and the support substrate 13 may be separated by the separating unit 15 formed of, for example, a metallic blade shown in FIG. 4A or a metallic wire shown in FIG. 4B.

Therefore, the support substrate 13 is removed from the flexible substrate 14 on which the OLED is formed, thereby implementing an OLED having a flexible property.

In at least one embodiment of the invention, the process of forming the OLED has been described, the OLED including the thin-film transistor formed on the flexible substrate bonded to the support substrate. However, the invention is not limited to the process, but may be also applied to all bonding and debonding methods including an FPD using a flexible substrate.

According to at least one embodiment of the invention, a flexible substrate bonding and debonding apparatus may pressurize a flexible substrate and a support substrate simultaneously with a heat-treatment process. Therefore, the flexible substrate may be more reliably bonded and debonded even at low temperature.

As a result, when a FPD including an OLED is manufactured using the flexible substrate bonding and debonding apparatus, it is possible to enhance productivity and to improve product quality.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A flexible substrate bonding and debonding apparatus, comprising:
   a chamber comprising first and second surfaces opposing each other;
   a first chuck located in a first portion of the chamber, wherein the first chuck comprises a first heater, and wherein the first portion is closer to the first surface than the second surface of the chamber;
   a second chuck located in a second portion of the chamber, wherein the second chuck comprises a second heater, wherein the second portion is closer to the second surface than the first surface of the chamber, wherein the first and second chucks comprise opposing surfaces, wherein the first and second chucks are configured to contact a support substrate and a flexible substrate via the opposing surfaces, and wherein the flexible substrate is thinner than the supporting substrate;
   a pressurizer connected to the second chuck and configured to apply pressure to at least one of the support substrate and flexible substrate via the second chuck so as to bond the two substrates; and
   a separator configured to separate the two substrates.

2. The flexible substrate bonding and debonding apparatus according to claim 1, wherein at least one of the first and second heaters comprises coil-shaped hot wires.

3. The flexible substrate bonding and debonding apparatus according to claim 1, wherein at least one of the first and second heaters comprises halogen lamps.

4. The flexible substrate bonding and debonding apparatus according to claim 1, wherein the second chuck comprises a cooling conduit configured to receive refrigerant.

5. The flexible substrate bonding and debonding apparatus according to claim 4, wherein the cooling conduit is integrated into the first chuck.

6. The flexible substrate bonding and debonding apparatus according to claim 4, wherein the refrigerant is cooling water.

7. The flexible substrate bonding and debonding apparatus according to claim 1, wherein the first and second heaters are integrated into the first and second chucks, respectively.

8. The flexible substrate bonding and debonding apparatus according to claim 1, wherein the first and second heaters are configured to heat the supporting substrate and flexible substrate, respectively.

9. The flexible substrate bonding and debonding apparatus according to claim 1, wherein the first chuck is configured to contact the supporting substrate and the second chuck is configured to contact the flexible substrate.

10. The flexible substrate bonding and debonding apparatus according to claim 1, wherein the separator is located between the first and second chucks.

11. The flexible substrate bonding and debonding apparatus according to claim 1, wherein the pressurizer is connected to the second chuck via a cylinder.

12. The flexible substrate bonding and debonding apparatus according to claim 1, wherein the separator is formed in a metal-blade shape.

13. The flexible substrate bonding and debonding apparatus according to claim 1, wherein the separator is formed of a metallic wire.

14. A flexible substrate bonding and debonding apparatus comprising:
  a chamber comprising first and second surfaces opposing each other;
  a first chuck located in a first portion of the chamber, wherein the first chuck comprises a first heater and a cooling conduit, wherein the first portion is closer to the first surface than the second surface of the chamber, wherein a portion of the cooling conduit is located outside the first chuck, and wherein the remaining portion of the cooling conduit is located outside the first chuck, and wherein the remaining portion of the cooling conduit is located inside the first chuck and bent twice;
  a second chuck located in a second portion of the chamber, wherein the second chuck comprises a second heater, wherein the second portion is closer to the second surface than the first surface of the chamber, wherein the first and second chucks comprise opposing surfaces, wherein the first and second chucks are configured to contact a support substrate and a flexible substrate via the opposing surfaces, and wherein the flexible substrate is thinner than the supporting substrate;
  a pressurizer connected to the second chuck and configured to apply pressure to at least one of the support substrate and flexible substrate via the second chuck so as to bond the two substrates; and
  a separator configured to separate the two substrates.

15. The flexible substrate bonding and debonding apparatus according to claim 14, wherein each of the first and second heaters comprises at least one of coil-shaped hot wires and halogen lamps.

16. The flexible substrate bonding and debonding apparatus according to claim 14, wherein the pressurizer is configured to apply pressure to the flexible substrate via the second chuck.

17. The flexible substrate bonding and debonding apparatus according to claim 14, wherein the first and second heaters are configured to heat the supporting substrate and flexible substrate, respectively.

18. The flexible substrate bonding and debonding apparatus according to claim 14, wherein the cooling conduit is configured to introduce cooling water.

19. The flexible substrate bonding and debonding apparatus of claim 14, wherein the cooling conduit is bent only twice inside the first chuck.

* * * * *